(12) United States Patent
Birzer et al.

(10) Patent No.: US 7,821,364 B2
(45) Date of Patent: Oct. 26, 2010

(54) CONNECTING SYSTEM COMPRISING AN ELECTROMAGNETIC SWITCHGEAR DEVICE, ESPECIALLY CONTACTOR, AND A CONNECTOR

(75) Inventors: Josef Birzer, Schwandorf (DE); Johann Drexler, Schwandorf (DE); Peter Hartinger, Bodenwöhr (DE)

(73) Assignee: Siemens Aktiengesellschaft, Munich (DE)

( * ) Notice: Subject to any disclaimer, the term of this patent is extended or adjusted under 35 U.S.C. 154(b) by 124 days.

(21) Appl. No.: 11/885,070

(22) PCT Filed: Jul. 28, 2006

(86) PCT No.: PCT/EP2006/064797

§ 371 (c)(1),
(2), (4) Date: Aug. 24, 2007

(87) PCT Pub. No.: WO2007/023062

PCT Pub. Date: Mar. 1, 2007

(65) Prior Publication Data

US 2008/0150660 A1 Jun. 26, 2008

(30) Foreign Application Priority Data

Aug. 25, 2005 (DE) .................. 10-2005-040-348

(51) Int. Cl.
*H01H 67/02* (2006.01)
*H01H 9/02* (2006.01)
(52) U.S. Cl. ...................................... 335/132; 335/202
(58) Field of Classification Search ............... 335/132, 335/202
See application file for complete search history.

(56) References Cited

U.S. PATENT DOCUMENTS

| 4,356,368 | A | * | 10/1982 | Osika ......................... 200/307 |
| 4,595,812 | A | * | 6/1986 | Tamaru et al. ............... 200/307 |
| 4,992,765 | A | * | 2/1991 | Hirota et al. ................. 335/131 |

(Continued)

FOREIGN PATENT DOCUMENTS

DE 89 00 361 4/1989

(Continued)

*Primary Examiner*—Elvin G Enad
*Assistant Examiner*—Alexander Talpalatskiy
(74) *Attorney, Agent, or Firm*—Harness, Dickey & Pierce, P.L.C.

(57) ABSTRACT

A connecting system includes an electromagnetic switchgear, especially contactor, and a connector. In at least one embodiment, the system makes it easier to connect auxiliary and control lines. For this purpose, the connecting system, in at least one embodiment, includes at least one electromagnetic switchgear, especially a contactor. The switchgear includes a plurality of auxiliary contact connections and a coil connection terminal block. The coil connection terminal block is configured in such a manner that the coil connections lie in a plane with at least one auxiliary contact connection. The connecting system also includes, in at least one embodiment, a connector for simultaneously contacting the coil and auxiliary contact connections of one or more switchgears which connections lie in one plane. The connector has an internal wiring for electrically interconnecting the coil and/or auxiliary contact connections.

13 Claims, 7 Drawing Sheets

U.S. PATENT DOCUMENTS

| | | | |
|---|---|---|---|
| 5,606,299 A * | 2/1997 | Innes et al. | 335/202 |
| 5,652,420 A * | 7/1997 | Innes et al. | 200/50.32 |
| 6,184,762 B1 * | 2/2001 | Reiss et al. | 335/202 |
| 6,411,184 B1 * | 6/2002 | Comtois et al. | 335/106 |
| 6,417,749 B1 * | 7/2002 | Kappel et al. | 335/132 |
| 6,452,468 B1 * | 9/2002 | Jacq et al. | 335/132 |
| 6,476,697 B2 * | 11/2002 | Swartzentruber et al. | 335/132 |
| 6,531,940 B1 * | 3/2003 | Busch | 335/132 |
| 6,621,393 B2 * | 9/2003 | Comtois et al. | 335/132 |
| 6,628,184 B1 * | 9/2003 | Cassagrande et al. | 335/132 |
| 6,661,321 B1 * | 12/2003 | Chuang | 335/132 |
| 6,784,770 B2 * | 8/2004 | Gimenez et al. | 335/18 |
| 2004/0041672 A1 * | 3/2004 | Chuang | 335/132 |

FOREIGN PATENT DOCUMENTS

FR    2786923    6/2000

* cited by examiner

CONNECTING SYSTEM COMPRISING AN ELECTROMAGNETIC SWITCHGEAR DEVICE, ESPECIALLY CONTACTOR, AND A CONNECTOR

PRIORITY STATEMENT

This application is the national phase under 35 U.S.C. §371 of PCT International Application No. PCT/EP2006/064797 which has an International filing date of Jul. 28, 2006, which designated the United States of America and which claims priority on German Patent Application number 10 2005 040 348.4 filed Aug. 25, 2005, the entire contents of which are hereby incorporated herein by reference.

FIELD

Embodiments of the invention generally relate to a connecting system, such as one comprising an electromagnetic switching device, especially contactor, and a plug connector, for example.

BACKGROUND

To activate a contactor, a voltage must be applied to the contactor drive. In this regard, it is known to provide at least two coil connection terminals permanently attached to the contactor housing. As contactors can be combined with other switching devices in different ways, these coil connection terminals are often concealed, so that in some cases they are provided once more at different places on the contactor housing. Particularly when the coil connection terminals are arranged next to the connection terminals for the main current path or auxiliary current path in order that the coil connector can be accessed from the front, at least one coil connection terminal is less well accessible when the contactor is combined with other switching devices. This is a problem particularly when conductors with large diameter are provided in order to switch larger powers.

As well as these devices, with which the coil connection terminals lie in one connecting plane with the main and auxiliary conductor terminals, switching devices are known with which the coil connection terminals are arranged underneath the main conductor terminals. With switching devices of this kind, accessibility is made more difficult when the main conductor is connected due to the even more complex design. When additional switching devices are attached, for example a circuit breaker and/or an overload relay, in these cases the coil connectors are no longer accessible at all.

In addition, when contactors or combinations of switching devices (for example reversing contactor combinations, star-delta contactor combinations, circuit-breaker-contactor combinations) are to be actuated and electrically interlocked, there is a requirement to connect the drives and auxiliary switches. This is usually carried out with insulated conductors, which are connected to the connection terminals provided for the purpose. However, with this connection technique, the time-consuming and possibly incorrect wiring of the switching devices is problematic.

DE 89 0 0361 U1 discloses an electromagnetic device, the auxiliary switch and coil connector of which are in one plane. A plug connector can be used to make contact with the auxiliary switch connectors.

SUMMARY

At least one embodiment of the invention simplifies the connection of auxiliary and control conductors in electromagnetic switching devices.

According to at least one embodiment, the connecting system has at least one electromagnetic switching device and a plug connector. It is important here that the plug connector is designed so that contact is made simultaneously with coil and auxiliary switch connectors of the at least one switching device, which lie in one plane, the plug connector having internal wiring to electrically connect the coil and/or auxiliary switch connectors together. As a result of this, on the one hand, the connection and therefore the handling of the switching device is considerably simplified, as, regardless of different attachments and connection techniques, the coil connector are provided flexibly and significantly more easily accessibly compared with the known solutions. On the other hand, according to the invention, only one other plug connector is required in each case to implement different connection functions.

Intricate and error-prone manual wiring of the auxiliary and control conductors is not required. Connection can be made considerably more quickly and without errors with the help of the pre-wired plug connector. The invention is therefore particularly well suited for use with switching device combinations without PLC control, which very often require additional auxiliary switch blocks plugged into the front.

According to these, an arrangement of the coil connector on the front of the switching device is particularly advantageous. Coil connection terminals can then be arranged universally in such a way that, due to the plug connector, accessibility can be realized from above, from below and from the front without having to provide coil connection terminals in several different places. By this, not only is the design of switching devices greatly simplified, but also the handling capability of a switching device of this kind is considerably improved, as a connection can be made from the front. At the same time, particularly easy handling is achieved by the use of a coil connection terminal block, which can be plugged in electrically and mechanically from the front. The coil connection terminal block is connected to the switching device not only mechanically but also electrically by making a single plug-in connection. Intricate additional connections are not required.

It is particularly advantageous when the coil connection terminal block and/or the auxiliary switch blocks are designed as integrated components in the plug connector. The coil connector or the connector of the auxiliary switches can thus be made simply by plugging in the plug connector to the front of the switching device without having to add intermediate elements in the form of separate blocks, which again considerably simplifies the handling.

BRIEF DESCRIPTION OF THE DRAWINGS

The invention is described below with reference to example embodiments, which are explained in more detail with the help of the drawings. In the drawings.

DETAILED DESCRIPTION OF THE EXAMPLE EMBODIMENTS

Figure 1:
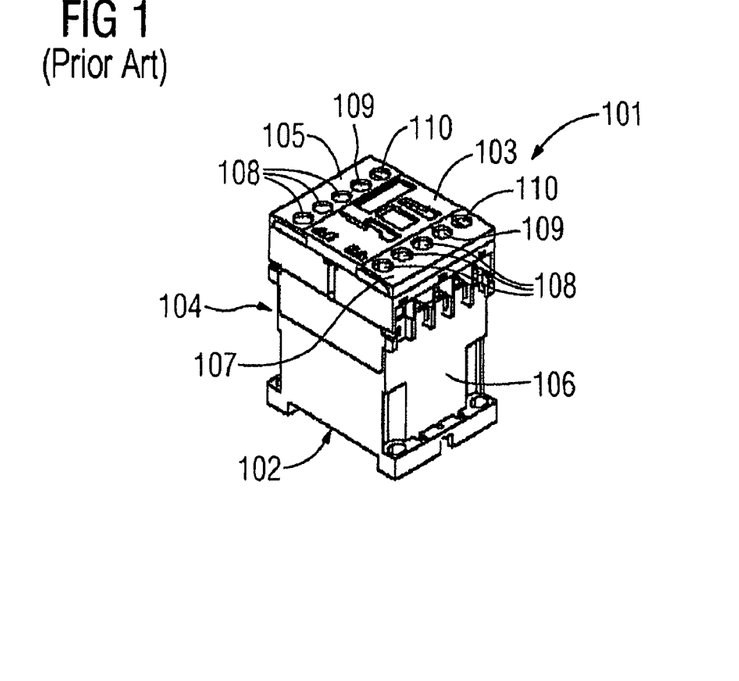
FIG. 1 shows a first contactor known from the prior art.

FIG. 1 shows a contactor 101 known from the prior art, which is shown with its rear 102 at the bottom and its front 103 at the top. An upper connector row 105 is provided on the front 103 of the contactor 101 in the direction of the contactor top 104, and a lower connector row 107 is provided in the direction of the contactor bottom 106. Here, the two connector rows 105, 107 each include three main current connectors 108, an auxiliary switch connector 109 and a coil connector 110. At the same time, the upper connector row 105 and the lower connector row 107 lie in one plane. Main current, auxiliary switch and coil connectors 108, 109, 110 are designed as screw connectors. The upper connector row 105 is used here as the input side and the lower connector row 107 as the output side.

Figure 2:
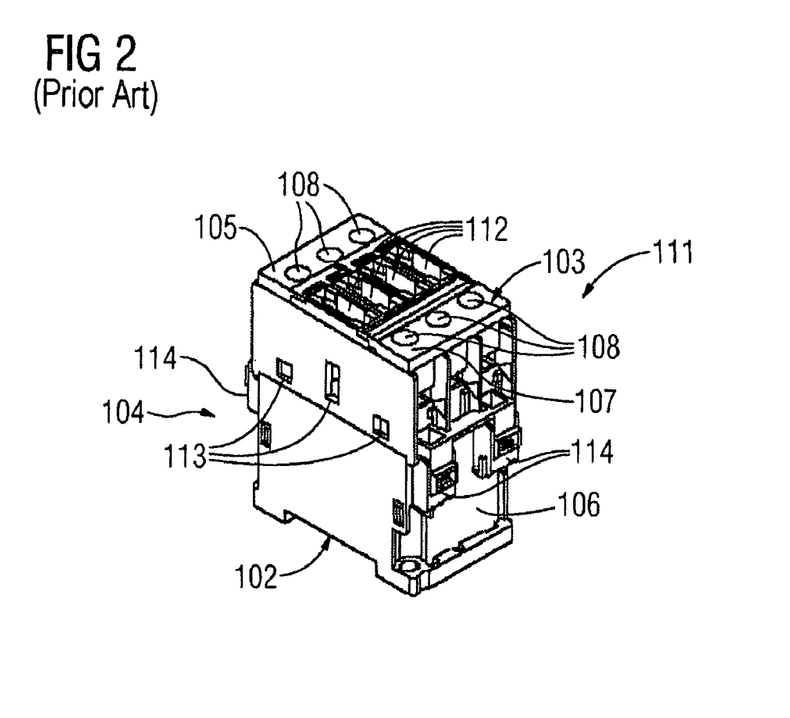
FIG. 2 shows a second contactor known from the prior art.

With the contactor 111 shown in FIG. 2, which is likewise known from the prior art, only three connectors instead of five are provided in each case in the same overall width as the contactor 101 from FIG. 1, so that larger connector cross sections can be used to switch higher currents. As the main current connectors 108 take up the whole width of the contactor 111, four receptacles 112 for additional auxiliary switches (not shown) are provided on the front 103 of the contactor 111. Auxiliary switches can, however, also be clipped to the side in the recesses 113 of the contactor housing provided for the purpose.

In order to connect the coils, two coil connectors 114 in each case, which are conductively connected to one another diagonally through the contactor housing, are provided on the contactor bottom 106 and also on the contactor top 104. If now, for example, such a contactor 111 is connected to a further switching device or similar at its bottom 106 or at its top 104, then individual coil connectors 114 are completely covered in such a way that contact can no longer be made to either the coil input or the coil output.

In contrast to these solutions known from the prior art, with a switching device according to at least one embodiment of the invention, the coil connection terminal block allows optimum accessibility to the terminals of the coil connector with any mounting arrangement of the switching device, and therefore avoids wires having to be routed over other switching devices.

At the same time, terminals with different connection technologies, for example screw connector, installation displacement terminal, push-in technology, cage tension spring etc., can be plugged into the switching device. If the switching device is a contactor in which the main conductor terminals are designed using screw technology, for example, all possible connector variants including the auxiliary and control conductors can be plugged in.

In other words, the switching device is prepared for plug-in connection of auxiliary and control conductors.

With the help of at least one embodiment of the invention it is possible to reduce the number of different designs required for switching devices. Even when the switching devices provide different connection technologies for the control terminals, they can be combined with one another with the help of at least one embodiment of the invention. Because of the plug connection, it is easy to replace the coil connection terminal block and therefore to change the connection technology, and this can also be carried out by the user.

Preferably, the coil connection terminal block, which can be plugged in from the front, is provided as the sole coil connector. In other words, no further coil connectors are provided in the direction of the top connector side or in the direction of the bottom connector side of the switching device. As a result, the constructional design of the switching device is greatly simplified without the functionality of the switching device suffering because of this. Of course, it is also possible to use the coil connection terminal block according to at least one embodiment of the invention to supplement existing fixed coil connection terminals.

It is particularly advantageous when the coil connection terminals are arranged in steps above one another. By this, different contact planes can be defined.

A coil connection terminal block with coil connection terminals arranged in steps above one another can preferably be turned in its connection direction. Depending on the arrangement on the switching device, contact can then be made to the coil connection terminal block both from below and from above. In other words, it is possible, for example, to use the coil connection terminal block with its upper step in the direction of the top connector side or in the direction of the bottom connector side of the switching device. As a result of this, the universal applicability of the coil connection terminal block according to at least one embodiment of the invention is further improved. The different connection planes can be oriented upward or downward depending on which combinations of devices or connection variants are required.

FIGS. 3 to 6 show coil connection terminal blocks 1, 2, 3, 4 according to the invention. The coil connection terminal block 1 shown in FIG. 3 has two coil connection terminals 5, 6, which are arranged in two connection planes 7, 8, which are arranged above one another in steps. The coil connection terminal block 1 has two plug contacts 10 in the form of contact pins on its bottom 9. These are used to make a simultaneous mechanical and electrical plug-in contact between the coil connection terminal block 1 and a contactor according to at least one embodiment of the invention.

Figure 4:
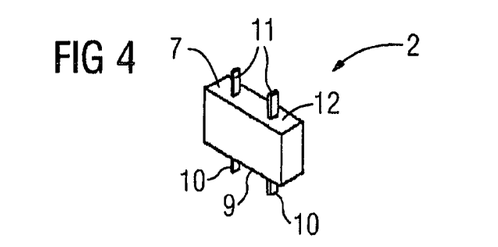
FIG. 4 shows a coil connection terminal block.
Figure 5:
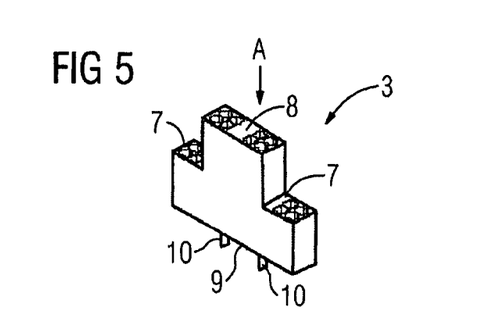
FIG. 5 shows a coil connection terminal block.
Figure 6:
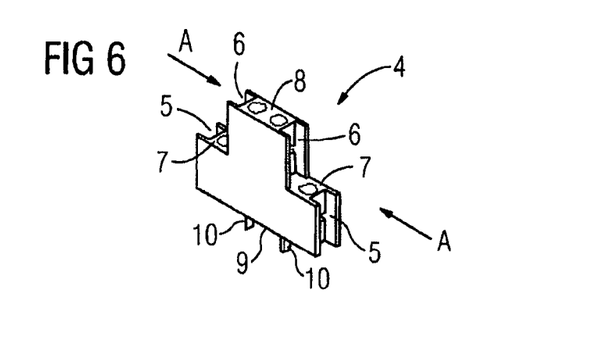
FIG. 6 shows a coil connection terminal block.

The coil connection terminals 5, 6 can be designed with clamp connections and/or plug-in connections and/or screw connections (FIG. 6). Alternatively, spring tension clamps can be arranged (FIG. 5). In the simplest case, the plug contacts 10 on the bottom 9 of the coil connection terminal block 2 are extended upward and protrude from the top 12 of the coil connection terminal block 2 as appropriate plug-in connection contacts 11 (FIG. 4). Of course, it is also possible for more than two coil connection terminals to be integrated in one coil connection terminal block 3, 4. It is therefore possible, for example, for two connection contacts to be provided on the input side and on the output side in each case (FIGS. 5 and 6). In variation with any desired steps to form different connection planes 7, 8, this results in a large number of connection variants. The connection directions are shown in FIGS. 3 to 6 by means of arrow A. Arrow A' shows an alternative connection option in FIG. 3.

Figure 7:
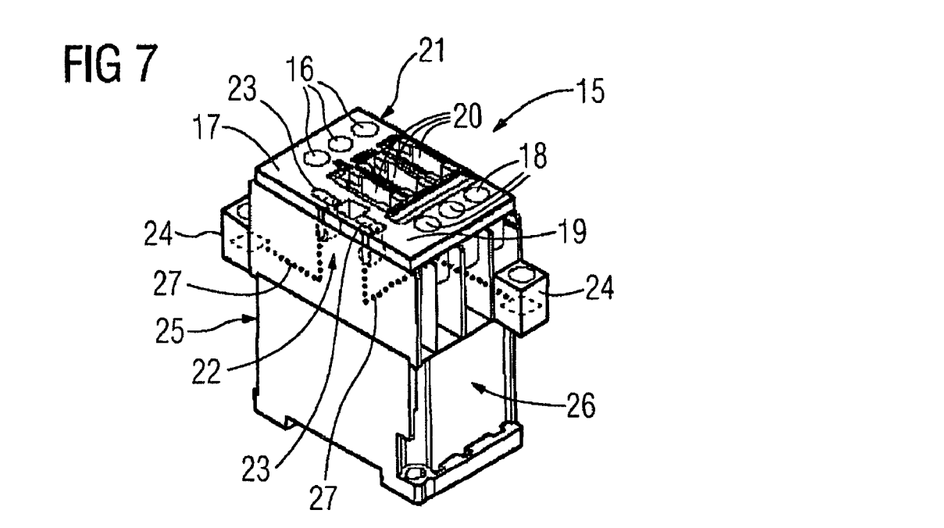
FIG. 7 shows a switching device.

An example of a contactor 15 according to an embodiment of the invention is shown in FIG. 7.

As well as the three input-side main current connectors 16 in an upper connector row 17 and three output-side main current connectors 18 in a lower connector row 19 and three receptacles 20 for additional auxiliary switches (not shown) already known from FIG. 2, an additional plug connector receptacle 22 is provided on the front 21 of the contactor 15 to form a plug connector. Here, the receptacle 22 has two receptacle openings 23 for accommodating the plug contacts 10 of a coil connection terminal block 1, 2, 3, 4 in such a way that, when a coil connection terminal block 1, 2, 3, 4 is plugged in, its plug contacts 10 are electrically connected to the coil connectors 24 on the contactor top 25 on the one hand and the contactor bottom 26 on the other. This connection can be created, for example, by a sheet metal part 27, a wire or similar device from the plug connector receptacle 22 to the coil.

Figure 8:
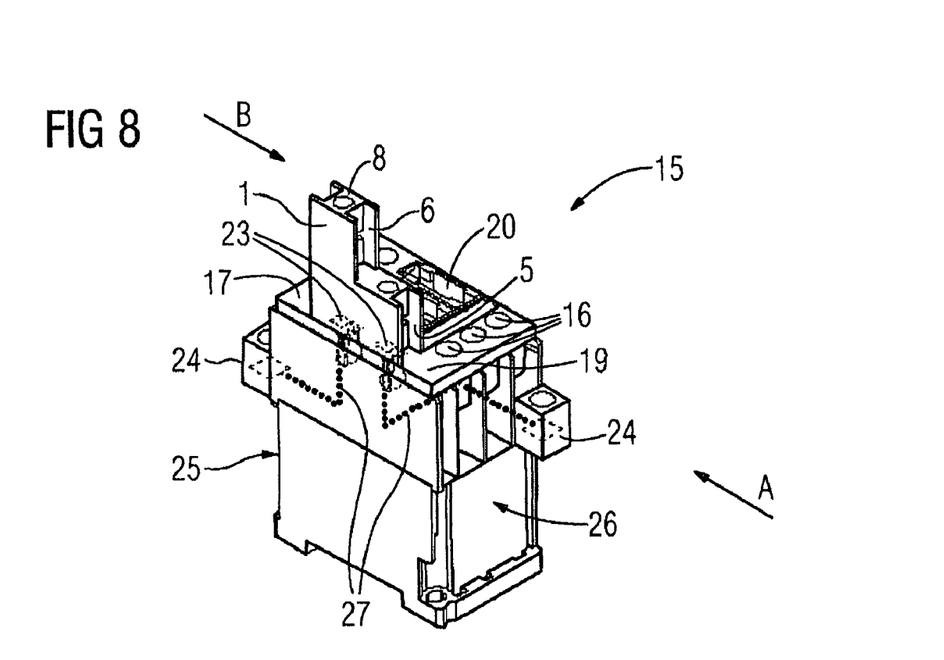
FIG. 8 shows a contactor with plugged-in coil connection terminal block.

FIG. 8 shows the contactor 15 from FIG. 7 with plugged-in coil connection terminal block 1. Here, the coil connection terminal block 1 with its plug contacts 10 and the plug connector receptacle 22 on the front 21 of the contactor 15 are designed in such a way that the coil connection terminal block 1 can be used with its upper step 8 in the direction of the upper connector row 17 (as shown). In this way, the coil connection terminals 5, 6 are accessible from below (arrow A). Furthermore, with the method of assembly shown in FIG. 8, it is also possible to connect the coil connection terminals 5, 6 from above (arrow B).

As an alternative to this, however, the coil connection terminal block 1 can also be used with its upper step 8 (rotated through 180°) in the direction of the lower connector row 19 of the contactor 15. This ensures that the coil connection terminals 5, 6 are also accessible from above (arrow B). Furthermore, it is also possible with this method of assembly to connect the coil connection terminals 5, 6 from below (arrow A). Because of the many connection variants, there are a large number of possible applications for the coil connection terminal block.

Figure 9:
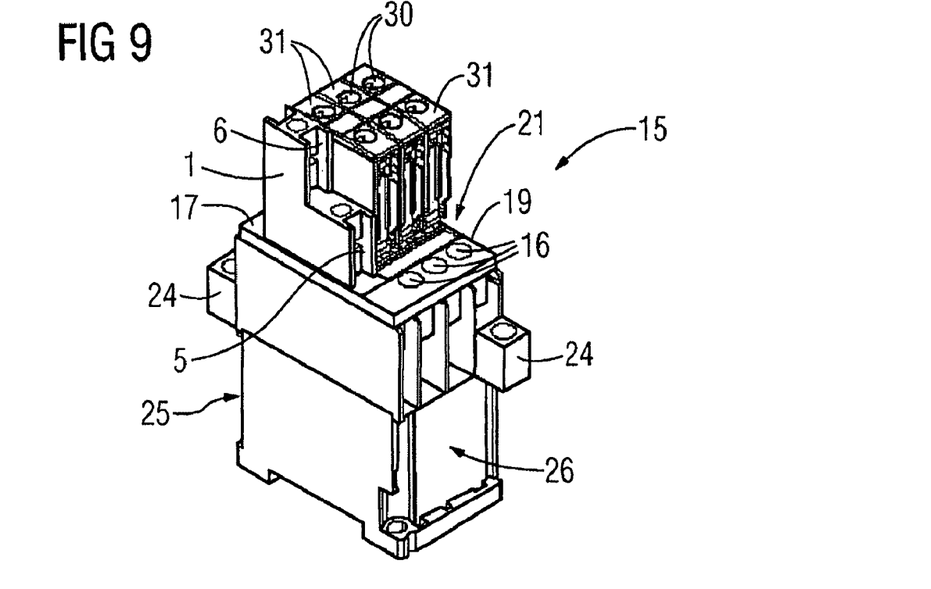
FIG. 9 shows a contactor with coil connection terminal block and auxiliary switch block.

At the same time, the coil connection terminal block 1 raises at least individual coil connection terminals 6 to the plane of the connection terminals 30 of front-mounted auxiliary switch blocks 31, as shown by way of example in FIG. 9. In this case, the input-side, top connection terminals 30 of the front auxiliary switch blocks 31 can be contacted with the higher, top connection plane 8 of the coil connection terminal block 1 by way of a common plug connector (not shown), which makes access easier.

Figure 10:
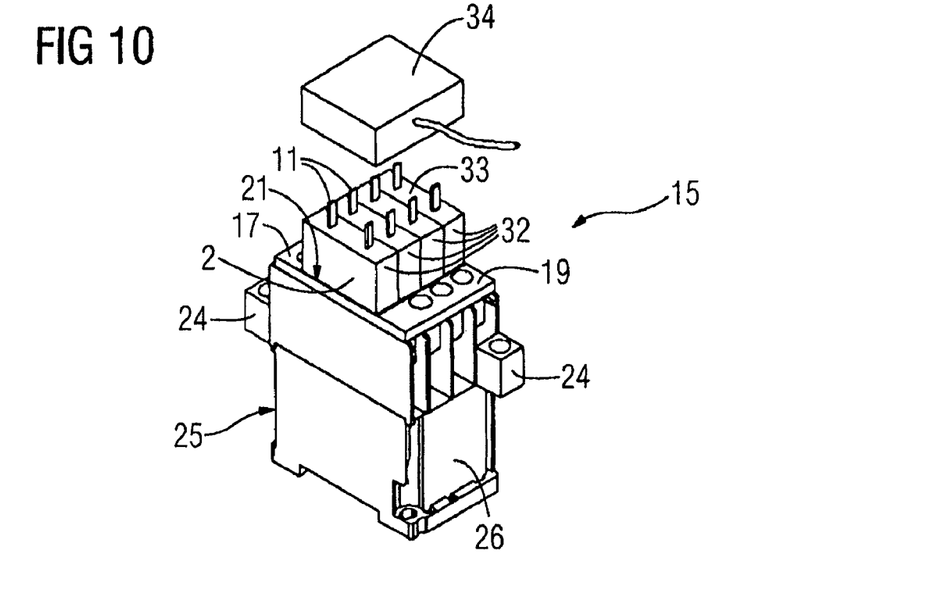
FIG. 10 shows a contactor with plug connector.

A further embodiment of the invention is shown in FIG. 10, in which again three auxiliary switch blocks 32 and one coil connection terminal block 2 are plugged in next to one another on the front 21 of the contactor 15. Here, all contacts 10, 11 are shown designed as plug contacts, as is the case with the coil connection terminal blocks 2 shown in FIG. 4. As all contacts 11 also lie in a common connection plane 33, all connectors including auxiliary and control connectors can be contacted from the front with the help of a common plug connector 34. Here, the plug connector 34 has internal wiring (not shown) for electrically connecting the coil and/or auxiliary switch connectors together. As a result, conductors can be quickly, easily and reliably fed together to superimposed control units such as buttons, indicating devices, PLCs etc.

In addition, conductors, which are used for interlocking or connecting the contacted devices (e.g. for looping through for a neutral conductor to the coil connector or for connecting the normally closed contact of a first contactor to a coil terminal of a second contactor in a reversing contactor combination) can be replaced by the internal wiring of the plug connector. The plug connector 34 is provided with a connecting conductor to connect to a superimposed control module or similar.

Of course, it is possible to contact contactors 15 which have blocks with different connector types with a plug connector 34. For example, contact could be made to a contactor 15 from the front with a plug connector 34, which has blocks 3 with connectors as shown in FIG. 5.

Figure 3:
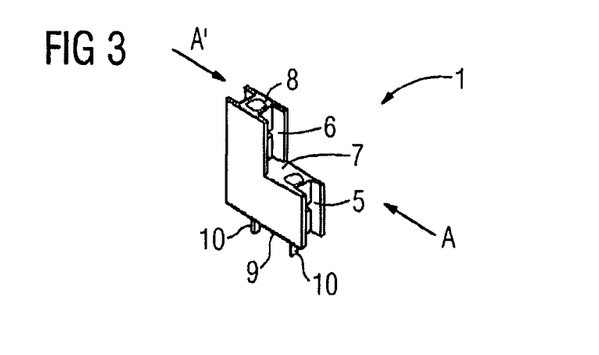
FIG. 3 shows a coil connection terminal block.

Likewise possible is a plug connector 34, which does not make contact from the front but connects the blocks in a lateral contact direction so that blocks 1, 4 can also be used with connectors as shown in FIGS. 3 and 6.

Figure 11:
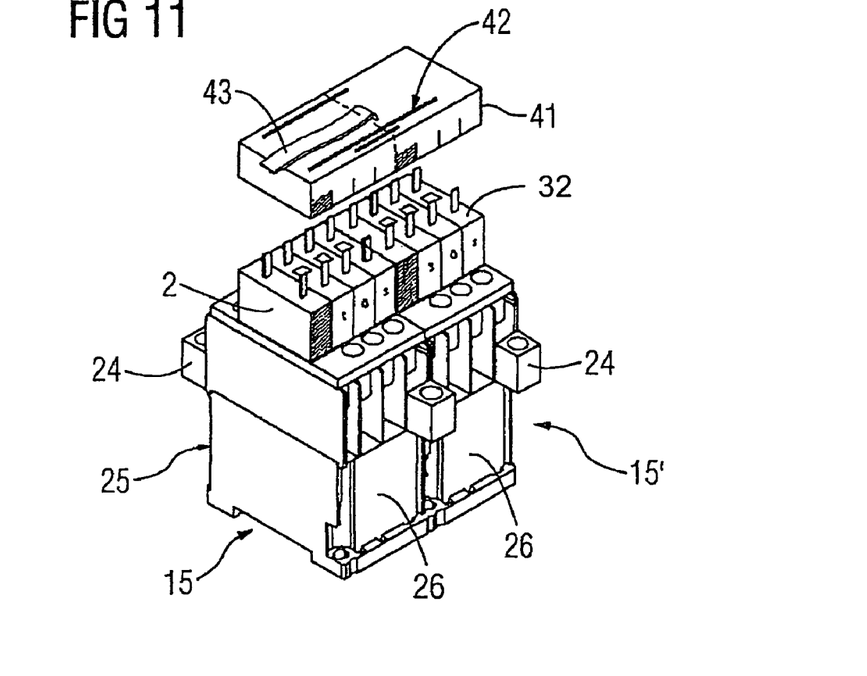
FIG. 11 shows a combination of two contactors with a common plug connector.

FIG. 11 illustrates the connection of two contactors 15, 15' with the help of a single plug connector 41. Each contactor 15, 15' again has three auxiliary switch blocks 32 (normally open, normally closed, normally open) and one coil connection terminal block 2 next to one another (in this order) giving a kind of reversing combination. Contact is made simultaneously with all eight blocks 2, 32 from the front with the plug connector 41. The plug connector 41 has integral wiring in the form of a wiring module, resulting in both auxiliary conductor wiring and main current path wiring (coil wiring).

As indicated by way of markings 42 on the top of the plug connector, the plug connector 41 shown connects the top coil connector of the first contactor 15 to the top coil connector of the second contactor 15' on the one hand and the bottom coil connector of the first contactor 15 to the bottom normally closed connector of the second contactor 15' and also the bottom normally closed connector of the first contactor 15 to the bottom coil connector of the second contactor 15' on the other. In other words, with the reversing contactor combination shown, a connection of the two coil terminals A2, the electrical cross-interlocking (by the connection of coil connector A1 of the first contactor 15 to the normally closed contact of the second contactor 15' and the connection of coil connector A1 of the second contactor 15' to the normally closed contact of the first contactor 15) and the coupling to a control system (e.g. buttons or PLC) by way of a ribbon cable 43 is achieved by means of the plug connector 41.

Thus, preferably not only a connection of the contacted contactors 15, 15' to one another but also a connection of the contactors to a bus system is achieved as a result of the plug connector 41 according to at least one embodiment of the invention. As an alternative to the ribbon cable 43, a connection to a superimposed control system can also be made with the help of a two-wire connection.

As shown in FIG. 11, connecting conductors are therefore reduced by internal links. These links can also be made by way of logic modules, for example, so that sufficient connections to realize certain (switching) functionalities can also be created by way of a simple electrical contacting. In other words, signal processing or signal conditioning can also take place in the plug connector 41.

The plug connector 41, which contacts the two contactors 15, 15' together, can be made in one piece. However, with regard to the manufacturing and storage costs, it is an advantage if only one type of plug connector is provided. The plug connector 41, which contacts the two contactors 15, 15' together, is therefore preferably assembled from two smaller plug connectors 34.

Figure 12:
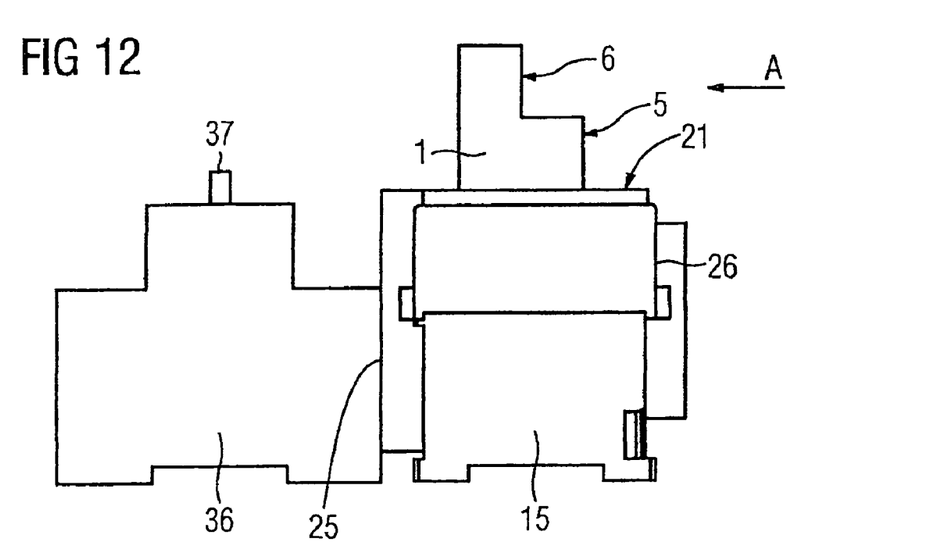
FIG. 12 shows a combination of a circuit breaker with a contactor.

FIG. 12 shows a schematic representation of a combination of a circuit breaker 36 and a contactor 15 according to at least one embodiment of the invention. Here, the contactor 15 is arranged underneath the circuit breaker 36 and connected thereto. In other words, the circuit breaker 36 abuts the top 25 of the contactor 15. In order that the manual operating device 37 of the circuit breaker 36 is freely accessible and not covered by conductors, a connection to the contactor 15 from below is required, that is to say from the direction of its bottom 26. Here, a front auxiliary switch block (not shown) with the connection terminals at the bottom is used. The coil connection terminal block 1 is fitted to the front 21 of the contactor 15 so that the connection terminals 5, 6 face downward. In other words, all auxiliary conductors (not shown) to the contactor 15 are routed to said contactor from below, as the top input side of the contactor 15 cannot be used on account of the adjacent circuit breaker 36. The connection direction is shown by way of arrow A.

Figure 13:
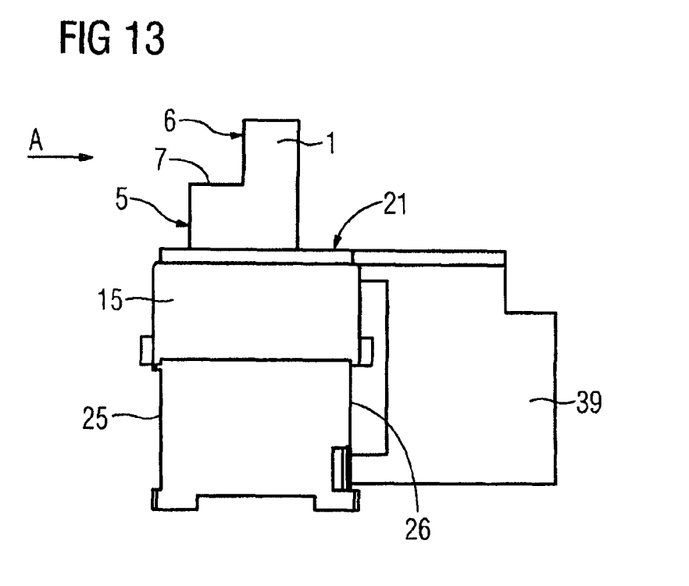
FIG. 13 shows a combination of a contactor with an overload relay.

A schematic representation of a combination of a contactor 15 with an overload relay 39 is shown in FIG. 13. Here, the overload relay 39 is arranged mechanically on the output side, that is to say the bottom 26 of the contactor 15. The coil connection terminal block 1 is arranged with its lower connector step 7 in the direction of the top 25 of the contactor, that is to say on the input side. From here, it is contacted by way of a wire (not shown). In other words, auxiliary conductors and coil are connected from above. The front auxiliary switch block (not shown) is used with the connection terminals at the top. The coil connection terminal block 1 is therefore turned in such a way that the connection terminals 5, 6 face upward so that all auxiliary conductors to the contactor 15 are connected from above. The connection direction is shown by means of arrow A.

Figure 14:
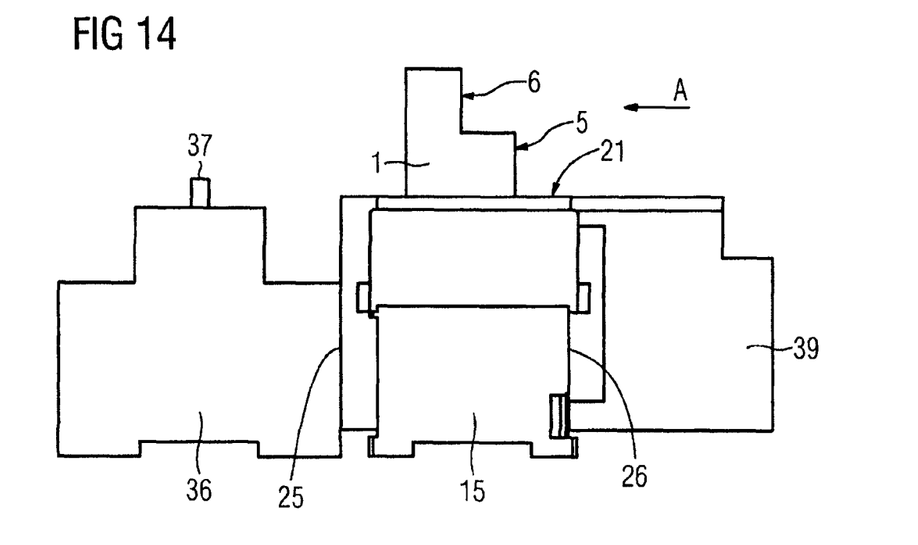
FIG. 14 shows a combination of a circuit breaker with a contactor and an overload relay.

Finally, FIG. 14 shows a schematic representation of a combination of circuit breaker 36, contactor 15 and overload relay 39. In this combination, with most known contactors, the coil connectors at both the top and the bottom are covered. By using the coil connection terminal block 1 according to at least one embodiment of the invention, accessibility to the coil connectors is guaranteed. The front auxiliary switch block (not shown) is used with the connection terminals at the bottom. The coil connection terminal block 1 is likewise turned so that the connection terminals 5, 6 face downward so that all auxiliary conductors to the contactor 15 are connected from below. The manual operating device 37 of the circuit breaker 36 therefore remains free. With at least one embodiment of the present invention, the ability to make a simple contact with this combination is possible for the first time. In addition, this results in a variably selectable conductor path via just one device, a conductor path via the overload relay 36 preferably being chosen. The connection direction is shown by means of arrow A.

Figure 15:
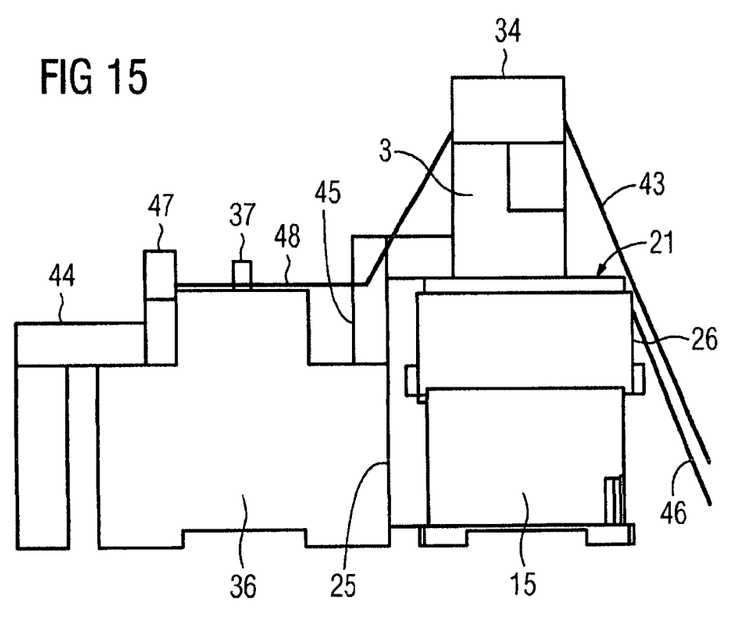
FIG. 15 shows a combination of a circuit breaker with a contactor with plug connector and connecting conductors.

FIG. 15 illustrates a schematic representation of a reversing contactor combination, that is to say a combination of a circuit breaker 36 and a contactor 15 according to at least one embodiment of the invention as already shown in FIG. 12. In contrast to FIG. 12, however, auxiliary switch blocks 32 are also plugged into the contactor as well as a coil connection terminal block 3. Here, the coil connector of the coil connection terminal block 3 is in a plane 8 with the auxiliary switch connectors 30. All connectors in this plane 8 are contacted with the help of a common plug connector 34.

The infeed system 44, with the help of which a main conductor is connected to the circuit breaker 36, is shown on the input side of the circuit breaker 36. A contact element 45, which connects the circuit breaker 36 to the contactor 15 and which is connected on the opposite output side of the circuit breaker 36, is used for connecting the contactor 15 to the main current path. The main conductor 46 then leaves the contactor 15 once more on the output side.

In addition, an auxiliary switch 47, by means of which the switching state of the circuit breaker 36 is transmitted to the plug connector 34, is provided on the circuit breaker 36. For this purpose, the auxiliary switch 47 is connected to the plug connector 34 by means of a signal conductor 48. The plug connector 34 also has a ribbon cable 43, which is used to connect the contactor 15 to a bus system and leaves the plug connector 34 on the output side. In other words, the individual connector are brought together by way of the plug connector 34 and passed on in bundled form to the ribbon cable 43, which connects the combination to a superimposed control point.

Figure 16:
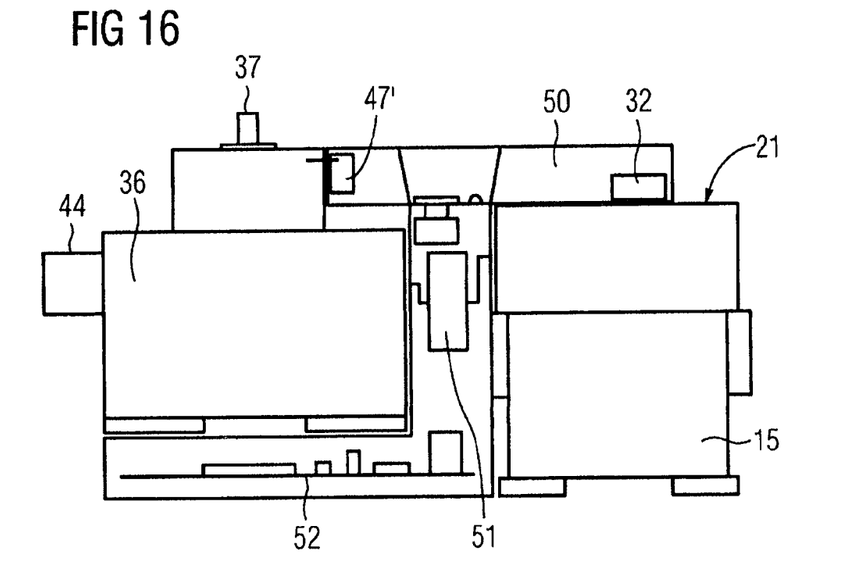
FIG. 16 shows a combination of a circuit breaker with a contactor with complete plug connector.

In contrast to FIG. 15, where the auxiliary switch 47 is coupled to the plug connector 34 by means of conductors 48, FIG. 16 shows a design of a system in which the circuit breaker 36 and contactor 15 are connected together by way of a complete plug connector 50. Not only the coil connection terminal block is integrated within this complete plug connector 50. It also contains the appropriate auxiliary switch blocks 32 so that it is designed for direct contact with the front 21 of the contactor 15. In other words, the plug contacts of this complete plug connector 50 are connected directly to corresponding plug connector receptacles 20, 22 on the front 21 of the contactor 15. The auxiliary switch 47' associated with the circuit breaker is also integrated within the complete plug connector 50.

The complete plug connector 50 is also used to connect the reversing contactor combination to a module arranged between circuit breaker 36 and contactor 15 for detecting and evaluating the current in the conductors, e.g. an overload relay 51, as well as to an overload protection device 52. From the assembly point of view, the overload protection device 52 is arranged behind the circuit breaker 36, within the installation depth of the combination so to speak, so that sufficient space for the complete plug connector 50 remains available at the front. On the other hand, the installation height of the combination is not increased by this arrangement.

Finally, the plug connector 50 also contains sensors, which interrogate the switching states of circuit breaker 36 and contactor 15. In addition, the contactor coil and the current evaluation module 51 are contacted and interlocked, and the connector either brought together centrally or connected to the control system by means of a communications interface. The complete plug connector 50 therefore picks up all the functions of the combination (motor feeder), which are then passed on to a central control unit, for example a PLC.

In summary, the following advantages therefore arise from at least one embodiment of the present invention: incorporation of several auxiliary switches into the plug connector system, use with widely differing contactors and sizes (same auxiliary switch and coil connection block for the contactors), optional incorporation of different circuit breakers by way of their auxiliary switches, and use of an identical interface (coupling point of front-mounted auxiliary switches), the interface being the same for most contactors across a range of sizes.

A core idea of at least one embodiment of the present invention resides in that direct contact can be made with both the front-mounted auxiliary switches and the coil connection terminals at the same time with the help of a plug connector. By this, considerably more auxiliary switches per device can be monitored, including with different contactors.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. Connecting system, comprising:
   at least one electromagnetic switching device;
   a plurality of auxiliary switch blocks having connection terminals on a surface opposite the at least one electromagnetic switch, the plurality of auxiliary switch blocks being insertably connected to the at least one electromagnetic switching device via a first receptacle on a surface thereof;
   a coil connection terminal block insertably connected to the at least one electromagnetic switching device via a second receptacle on the surface thereof, the coil connection terminal block including connection terminals lying in one plane with the connection terminals of the at least one auxiliary switch block when the coil connection terminal block and an auxiliary switch block are operatively connected to the electromagnetic switching device; and
   a common plug connector to simultaneously make contact with a contact of the coil connection terminal block and a contact of the auxiliary switch connectors, the common plug connector including internal wiring that electrically connects the coil connection terminal block and the at least one auxiliary switch connectors together.

2. Connecting system as claimed in claim 1, wherein the coil connection terminal block is at least one of electrically and mechanically pluggable into a front of the switching device.

3. Connecting system as claimed in claim 1, wherein at least one of the coil connection terminal block and a plurality of auxiliary switch blocks is integrated within the plug connector.

4. Connecting system as claimed in claim 2, wherein at least one of the coil connection terminal block and a plurality of auxiliary switch blocks is integrated within the plug connector.

5. Connecting system as claimed in claim 1, wherein the at least one electromagnetic switching device includes a contactor.

6. Connecting system as claimed in claim 2, wherein the at least one electromagnetic switching device includes a contactor.

7. Connecting system as claimed in claim 3, wherein the at least one electromagnetic switching device includes a contactor.

8. Connecting system as claimed in claim 4, wherein the at least one electromagnetic switching device includes a contactor.

9. Connecting system as claimed in claim 1, wherein the coil connection terminal block includes at least two different connection planes arranged one above the other.

10. Connecting system as claimed in claim 9, wherein the coil connection terminal block includes contacts on a bottom surface and each of the at least two different connection planes.

11. Connecting system as claimed in claim 2, wherein the coil connection terminal block includes plug-in contacts on a top surface and a bottom surface thereof.

12. Connecting system as claimed in claim 10, wherein the coil connection terminal block includes a coil connection terminal on a side surface thereof.

13. Connecting system as claimed in claim 1, wherein the first receptacle and the second receptacle are adjacent to one another.

* * * * *